United States Patent Office 3,637,887
Patented Jan. 25, 1972

3,637,887
METHOD FOR PRODUCING ISOPRENE
Kazumi Takagi and Teruo Matsuda, Niihama-shi, Ehime-ken, Japan, assignors to Sumitomo Chemical Co., Ltd., Osaka-fu, Japan
No Drawing. Filed Jan. 30, 1970, Ser. No. 7,216
Claims priority, application Japan, Jan. 30, 1969, 44/7,107
Int. Cl. C07c *1/20, 41/12*
U.S. Cl. 260—681   12 Claims

ABSTRACT OF THE DISCLOSURE

Method for producing isoprene which comprises contacting isobutene with glycol methylene ether in the gas phase in the presence of a solid catalyst. Since glycol methylene ether is highly stable under the reaction conditions, the yield of isoprene based thereon is excellent.

---

The present invention relates to a method for producing isoprene from isobutene and glycol methylene ether (i.e. glycol formal or dioxolane).

For the production of isoprene, there have been proposed the following various methods: (1) the "Goodyear-SD method" using propylene, (2) the "extraction method" using the $C_5$ fraction by-produced in naphtha cracking, (3) the "IFP method" (or the "modified IFP method") using isobutene and Formalin, etc. Some of these methods have been employed on a practical scale for commercial production but disadvantages are encountered with respect to the starting materials, the catalyst, the reaction steps and so on. Particularly advantageous is the modified IFP method from the viewpoints of using less expensive starting materials and requiring only a single step. However, the yield of isoprene based on the starting formaldehyde in this method is extremely low, because formaldehyde is readily decomposed during the reaction to produce a large amount of carbon monoxide with other side reactions. In order to avoid such a drawback, there has been proposed the use of methylal instead of formaldehyde [Japanese patent publication No. 19082/1965]. Methylal is, however, still not sufficiently stable and is decomposed with facility under the reaction conditions required for the production of isoprene. This decomposition is particularly accelerated in the presence of an alumina catalyst.

In the course of the study on the reaction between isobutene and formaldehyde derivatives, it has been found that glycol methylene ether is much more stable than methylal. It has also been found that the reaction between isobutene and glycol methylene ether gives isoprene with ease and in a nearly quantitative yield. The present invention is based on these findings.

Hence, one of the objects of the present invention is to provide an improved process for the production of isoprene in good yield which overcomes the disadvantages and deficiencies of the prior art methods.

These and other objects and davantages of the present invention will become apparent to those skilled in the art from a consideration of the following specification and claims.

According to the present invention, isoprene is produced by contacting isobutene with glycol methylene ether in the gas phase in the presence of a solid catalyst. The reaction is shown by the following reaction scheme:

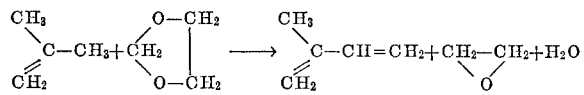

The solid catalyst may be a solid acid catalyst or a catalyst system consisting essentially of a mixture of a solid acid catalyst and an oxide of an element belonging to Group I or II in the Mendeléeff Periodic Table, such as oxides of cobalt, silver, magnesium, calcium, zinc or cadmium, or a mixture of a solid catalyst and an inorganic acid salt of an element belonging to Group I or II in the Mendeléeff Periodic Table, such as the phosphate, sulfate, chloride, borate, phosphorus wolframate or borotungstate of magnesium; calcium, zinc, cadmium, iron, nickel, cobalt, aluminum, chromium, manganese, sodium, potassium or calcium.

Specific examples of the solid acid catalyst include alumina, silica, silica-alumina, silica, magnesia, diatomaceous earth, molecular sieves, nickel sulfate, etc.

The reaction temperature may be from about 200° to about 500° C., preferably from about 250° to about 450° C.

The starting materials, i.e., isobutene and glycol methylene ether, are introduced into a reaction zone, if necessary, with a diluting material such as nitrogen, carbon dioxide or a lower hydrocarbon. The molar ratio of isobutene to glycol methylene ether to be introduced into the reaction zone is usually from 1:1 to 50:1. When the complete conversion of glycol methylene ether is desired, a relatively high rate of isobutene may be employed. When the recycle use of not only isobutene but also glycol methylene ether is intended, the said molar ratio employed is preferably from 1:1 to 15:1.

The space velocity employed in the present method can be selected from such a markedly wide range as from 500 to 5000 hr.$^{-1}$.

The reaction may be carried out by the use of a fixed bed-type or fluidized bed-type catalyst.

The conversions of glycol methylene ether shown in Examples 1 and 2 are low as they are a one pass conversion. However, this conversion will be higher if glycol methylene ether is continuously recycled. Therefore, the reaction between isobutene and glycol methylene ether gives isoprene in a nearly quantitative (100%) yield.

The effluent gas from the reaction zone includes the reaction products (i.e. isoprene, ethylene oxide, water) and unreacted starting materials. Ethylene glycol is scarcely by-produced. Such effluent gas is contacted with water for cooling, during which unreacted glycol methylene ether and ethylene oxide are absorbed. From the unabsorbed gaseous mixture, there are recovered separately isoprene and isobutene, of which the latter is recycled to the reaction zone for the production of isoprene. The water absorbing the glycol methylene ether and ethylene oxide is heated or distilled so as to recover separately glycol methylene ether and ethylene oxide, of which the former is recycled as such to the reaction zone for the production of isoprene and the latter is reacted with formaldehyde to convert it into glycol methylene ether, which is then sent to the said reaction zone. The reaction of ethylene oxide with formaldehyde to produce glycol methylene ether is known and may be carried out, for instance, by heating them in water in the presence of an acid catalyst at 50° to 150° C. Still, an organic solvent may be used in place of water for cooling and washing the effluent gas, whereby isoprene and isobutene are absorbed and the absorption liquid is distilled to recover isoprene.

Thus, the present method is advantageous for the commercial production of isoprene since the starting materials of the present invention consist essentially of isobutene and formaldehyde.

Practical and presently-preferred embodiments of the invention are illustratively shown in the following examples.

The term "NTP" is intended to mean normal temperature (° C.) and pressure (1 atm.).

The conversion based on glycol methylene ether and the selectivity for isoprene are calculated according to the following equations:

The conversion of glycol methylene ether (percent)

$$= \frac{\text{(Moles of fed glycol methylene ether)} - \text{(Moles of recovered glycol methylene ether)}}{\text{(Moles of fed glycol methylene ether)}} \times 100$$

The selectivity for isoprene (percent)

$$= \frac{\text{(Moles of isoprene produced)}}{\text{(Moles of fed glycol methylene ether)} \times \text{(Moles of recovered glycol methylene ether)}} \times 100$$

EXAMPLE 1

Activated alumina of 8 to 14 mesh (9 ml.) is calcined under an atmosphere of nitrogen at 700° C. for 5 hours and charged in a glass-made reaction tube of 1 mm. in inner diameter. The reaction tube is immersed in a salt bath heated at 300° C. and the atmosphere in the reaction tube is replaced by nitrogen. Isobutene and glycol methylene ether are then fed into the reaction tube respectively at a feeding velocity of 16 l. (NTP)/hr. and of 1.8 l. (NTP)/hr. The inner temperature of the reaction tube is raised up to 300° C., and the effluent gas from the reaction tube is absorbed for 1 hour in n-propanol cooled with solid carbon dioxide-methanol. By gas chromatography of the absorption liquid, it is confirmed that the conversion of glycol methylene ether is 28.9% and the selectivity for isoprene is 98.5%. It is also confirmed that an equimolar amount of ethylene oxide to isoprene is simultaneously produced.

EXAMPLE 2

Silica-alumina ("AK–4," No. 10, manufactured by Nikka Seiko Co., Ltd.); consisting of 43.1% by weight of $Al_2O_3$, 44.2% by weight of $SiO_2$, 2.8% by weight of $Fe_2O_3$, 1.4% by weight of CaO, 1.4% by weight of MgO and 7.1% by weight of other materials (9 ml.) is calcined under an atmsophere of nitrogen at 700° C. for 5 hours and charged in a glass-made reaction tube of 12 mm. in inner diameter. The reaction tube is immersed in a salt bath heated at 300° C. and the atmosphere in the reaction tube is replaced by nitrogen. Isobutene and glycol methylene ether are then fed into the reaction tube respectively at a feeding velocity of 16 l. (NTP)/hr. and of 1.8 l. (NTP)/hr. The inner temperature of the reaction tube is raised up to 300° C., and the effluent gas from the reaction tube is absorbed for 1 hour in n-propanol cooled with solid carbon dioxide-methanol. By gas-chromatography of the absorption liquid, it is confirmed that the conversion of glycol methylene ether is 15.1% and the selectivity for isoprene is 94.6%. It is also confirmed that an equimolar amount of ethylene oxide to isoprene is simultaneously produced.

The invention being thus described, it will be obvious that the same may be varied in many ways. Such variations are not to be regarded as a departure from the spirit and scope of the invention, and all such modifications as would be obvious to one skilled in the art are intended to be included herein.

We claim:

1. A method for producing isoprene which comprises contacting isobutene with glycol methylene ether in the gas phase in the presence of a solid catalyst.

2. A method according to claim 1, wherein the by-produced ethylene oxide is recovered and reacted with formaldehyde to produce glycol methylene ether, which is recycled to the reaction zone.

3. A method according to claim 1, wherein the molar ratio of isobutene to glycol methylene ether introduced into the reaction zone is from 1:1 to 50:1.

4. A method according to claim 1, wherein the reaction temperature is from about 200° to about 500° C.

5. A method according to claim 1, wherein the solid catalyst is a solid acid catalyst, a catalyst system consisting essentially of a mixture of a solid acid catalyst and an oxide, or a mixture of a solid acid catalyst and an inorganic acid salt of an element belonging to Group I or II in the Mendeléeff Periodic Table.

6. A method according to claim 1, wherein the space velocity is from about 500 to about 5000 hr.$^{-1}$.

7. A method for producing isoprene which comprises contacting isobutene with glycol methylene ether in the gas phase at a temperature of about 200° to 500° C. in the presence of a solid catalyst selected from the group consisting of a solid acid catalyst, a catalyst system consisting essentially of a mixture of a solid acid catalyst and an oxide of an element belonging to Group I or II in the Mendeléeff Periodic Table and a mixture of a solid acid catalyst and an inorganic acid salt of an element belonging to Group I or II in the Mendeléeff Periodic Table.

8. A method according to claim 7, wherein said solid acid catalyst is selected from the group consisting of alumina, silica, silica-alumina, silica-magnesia, diatomaceous earth, molecular sieves and nickel sulfate.

9. A method according to claim 8, wherein said oxide is selected from the group consisting of oxides of cobalt, silver, magnesium, calcium, zinc and cadmium.

10. A method according to claim 8, wherein said inorganic acid salt is selected from the group consisting of the phosphates, sulfates, chlorides, borates, phosphorus wolframates and borotungstate of magnesium, calcium, zinc, cadmium, iron, nickel, cobalt, aluminum, chromium, manganese, sodium, potassium and calcium.

11. A method according to claim 8, wherein the molar ratio of isobutene to glycol methylene ether introduced into the reaction zone is from 1:1 to 50:1.

12. A method according to claim 8, wherein the space velocity is from about 500 to about 5000 hr.$^{-1}$.

References Cited
UNITED STATES PATENTS

| | | | |
|---|---|---|---|
| 3,146,278 | 8/1964 | Habeshaw et al. | 260—681 |
| 3,253,051 | 5/1966 | Yanagita et al. | 260—681 |

FOREIGN PATENTS

| | | | |
|---|---|---|---|
| 19,082 | 1965 | Japan | 260—681 |

DELBERT E. GANTZ, Primary Examiner

G. E. SCHMITKONS, Assistant Examiner

U.S. Cl. X.R.

260—611, 614, 615